| United States Patent [19] | [11] | 4,107,339 |
|---|---|---|
| Shrimpton | [45] | Aug. 15, 1978 |

[54] SOLUBLE COFFEE PROCESS AND PRODUCT

[75] Inventor: Brian Clifford Shrimpton, Chipping Warden, England

[73] Assignee: General Foods Limited, Banbury, England

[21] Appl. No.: 819,088

[22] Filed: Jul. 26, 1977

[30] Foreign Application Priority Data

Jul. 29, 1976 [GB] United Kingdom .............. 31711/76

[51] Int. Cl.² ............................................. A23F 1/08
[52] U.S. Cl. ..................................... 426/387; 426/594
[58] Field of Search ...................... 426/387, 386, 594

[56] References Cited

U.S. PATENT DOCUMENTS

| 3,809,781 | 5/1974 | Howland et al. ............... 426/387 X |
| 3,965,269 | 6/1976 | Lee et al. ............................ 426/387 |
| 4,045,586 | 8/1977 | Howland et al. ................. 426/387 |

*Primary Examiner*—Joseph M. Golian
*Attorney, Agent, or Firm*—Howard J. Newby; Thomas V. Sullivan; Bruno P. Struzzi

[57] ABSTRACT

Soluble coffee process involving the addition of a partial condensate of volatile flavorful components to a concentrated coffee extract which has previously been stripped of its volatile flavorful components and subjecting this enhanced concentrated coffee extract to a dehydration process which maximizes the retention of the flavorful components to provide a soluble coffee product with distinct green/nutty flavor notes.

6 Claims, No Drawings

SOLUBLE COFFEE PROCESS AND PRODUCT

This invention relates to the production of soluble coffee, and in particular, is directed to a process for producing a soluble coffee having a unique flavour, with a preponderance of green/nutty flavour notes.

More specifically, the process of the invention entails the enhancement of concentrated coffee extract with a selected fraction of coffee flavourful components with the desired flavour notes, then drying and agglomerating the extract under processing conditions which assist retention and have a minimum of deleterious effect on the quality of the flavourful components.

A plethora of information has been published devoted to the production of soluble coffee. A significant proportion of this information is concerned with various techniques for enhancing the aroma and flavour of the finished soluble coffee product. The ultimate goal has been, and continues to be, the production of a soluble coffee which yields a coffee beverage having the aroma and flavour qualities equal to that obtained from freshly roasted and ground coffee. Suffice it to say, within present knowledge, this goal has not been attained - at least on a commercial basis.

Efforts to improve upon the flavour of soluble coffee have been directed to capturing the flavour components of the roasted ground coffee either prior to extracting the bulk of the soluble solids from the coffee or by evaporative stripping of commercial coffee extracts; and then adding back these flavour components to extract before or after spray drying.

The intent of the prior art endeavours has been generally to produce a soluble coffee which is substantially equivalent to that of regular roast and ground coffee in flavour and aroma since soluble coffee, when compared with roasted and ground coffee, offers the consumer the profound advantage of convenience of preparation of the coffee beverage; therefore, there exists a major incentive to continue these endeavours.

In contrast to the prior art processes which have, for the most part, been developed from endeavours to produce soluble coffee products approaching the flavour and aroma of roasted and ground coffee, the present invention is directed to a process which produces a soluble coffee product having a desirable flavour with a preponderance of green/nutty flavour notes and, although having a flavour and aroma significantly different from that of roasted and ground coffee, has received wide consumer preference compared with the soluble coffees prepared by some of the prior art processes.

Briefly, what the prior art has either failed to recognize, or has recognized and not taken advantage of, is the fact that concentrated coffee extract obtained by extracting the soluble coffee solids from roasted and ground coffee in a commercial system of an extraction column battery, when diluted to a soluble solids content equivalent to that of the typical coffee beverage, does not duplicate the typical brewed coffee beverage in aroma and flavour character. The difference is probably due in part to the elevated temperature conditions and extended processing periods employed in the commercial operations. Therefore, starting with an extract from a commercial extractio system, it is virtually impossible, by further dehydration processing, to produce a soluble coffee product which duplicates brewed roasted and ground coffee in flavour and aroma character.

In their endeavours to duplicate the flavour and aroma of roasted and ground coffee, many of the prior art practitioners have attempted to recover all of the armomatics which are stripped during the evaporative stripping process and add all of the aromatics recovered back to the concentrated extract to be dehydrated. As the addition of all these aromatic fractions back to the extract would do no more than duplicate the quality of the aroma and flavour of the original extract from the extraction column battery, the fortified extract, having all of the aroma and flavour fractions adding back thereto, would not be a suitable starting material for the production of a soluble coffee duplicating the flavour and aroma of roast and ground brewed coffee.

As distinguished from this prior art, the crux of the present invention is to recover selectively a specific fraction of the total of the flavourful components which are stripped by an evaporative stripping technique and fortify the coffee extract, after it has been suitably concentrated, with this selected fraction. In so doing, Applicant is well aware that a soluble coffee having substantially the same aroma and flavour of roast and ground coffee will not be attained. However, what is obtained, particularly through the combination of the selective addition of flavourful fractions plus the dehydration of the so fortified concentrated extract by a low temperature spray drying technique is a unique soluble coffee — one having a green/nutty flavour which is distinctly different from prior art products.

For the purpose of this invention, the term 'green/nutty' as defined by expert flavour panellists, is employed to express the nutty flavour notes reminiscent of roasted nuts, slightly sweet and smooth and the green flavour notes associated with raw vegetables and green coffee.

The essence of the present invention is manifest in a process for (1) removing a substantial proportion of all of the volatile flavour components from the coffee extract prepared from an extraction battery, (2) recovering a selected fraction of these volatile flavour components (3) adding-back the selected fraction of volatile flavour components to the bulk of the extract, subsequent to it being further concentrated, and (4) then low temperature spray-drying the enhanced, concentrated liquid extract. A further processing step of agglomerating the spray dried coffee powder to form granules (for preferred appearance and bulk density purposes) is an adjunct to the process of the invention. The resulting product of the invention, in either spray dried powder form or agglomerated granule form, produces a beverage which has a distinct green/nutty flavour. Although different in overall aromatic and flavour quality from that of a beverage domestically brewed from roasted and ground coffee, the beverage brewed from the product of the invention has received wide consumer acceptance.

The process of the invention takes advantage of the fact the controlling factors with respect to the quantity of volatile components which are evaporatively stripped from the extract are the relative volatility of the components (taken at infinite dilution i.e.) and the percentage of water evaporated from the extract. The temperature (absolute pressure) in the evaporation zone at which the volatile components are evaporatively stripped from the extract is relatively unimportant with respect to the total quantity of flavourful compounds removed from the extract. To assure the desirable quantity of stripped flavourful components, however, relatively elevated absolute pressure, in the range of from 16" Hg to atmospheric pressure (and corresponding elevated equilibrium temperature) is employed and, for a coffee extract taken from an extraction battery having a soluble solids content ranging from 12 to 30% (w/w) at least 5 to 15% of the water in the feed extract is to be removed with the flavour components. The extract from the extraction column battery should be maintained at a temperature of less than 68° F in order to minimize deterioration of the flavourful components therein and should be clarified.

Stripping of the flavour fractions from coffee extract can also be conducted at low absolute pressures and temperatures as disclosed by Adler et al. British Pat. No. 871,984 and at intermediate absolute pressures of from 6 to 15 inches Hg (with corresponding intermediate temperatures) as disclosed in British Pat. No. 1,265,206.

However, the removal of a selected portion of the flavourful compounds of desired quality through control of the absolute pressure in the evaporative zone alone is difficult.

Partial condensation of the aroma and flavourful components - containing aqueous vapour from the stripper is, however, both a feasible and controllable method for recovering a selected fraction of the flavorful components for add-back to the concentrated coffee extract.

The selected fraction of the volatiles stripped from the coffee extract during the evaporative stripping process is obtained by a carefully controlled condensation process. It has been discovered that a carefully controlled condensing operation provides a selected portion of the stripped aromatics as an aqueous condensate which has predominantly green/nutty flavour notes. This condensate when added to the concentrated bulk of the extract and the mixture then subjected to the temperature conditions of controlled low-temperature spray drying (described below) imparts a green/nutty flavour to the finished spray dried product.

Carefully controlled agglomeration conditions, while not improving the impact of the green/nutty flavour, are employed to convert the spray dried powder to granule form. Thus, the resulting product is that of a spray dried powder having a distinctive green/nutty flavour or, alternatively, a spray dried powder which has been agglomerated to granule form with a slightly less nutty flavour.

The controlling factors affecting the quantity and quality of the flavourful components in the condensate of the vapours taken from the evaporative stripping zone are the absolute pressure in the condenser (which may or may not be the same as in the evaporative stripping zone), the temperature of the condensate (as determined by the temperature of the cooling surface employed) and, importantly, the quantity of non-condensable gases issuing from the condensers (or rather the ratio of noncondensable gas volume to condensate weight per unit of time). The non-condensable gases can arise from leakage in the equipment as from entrapped gases in the extract fed to the evaporators. Briefly, the higher the condensers pressure, the lower the condensate temperature and the lower the non-condensable gas ratio, the greater will be the efficiency of the condensation. The composition of the condensate is, therefore, clearly determined by the precise conditions in the condenser and these condenser conditions are more important for selecting the desired fraction of flavour components than the absolute pressure in the evaporative stripping zone.

In performing the process of the invention, volatile flavour components in water are stripped from the coffee extract, preferably by passing the extract continuously through a single stage plate evaporator operated at a pressure of from 16 inches Hg to atmospheric pressure (absolute pressure) such that from 5 to 15% of the water originally present in the extract is evaporated, preferably from 5 to 10%. Any type of evaporator may be employed, though an evaporator of the film type is preferred. It is desirable to operate close to equilibrium conditions by providing adequate evaporating surface. The removal of 80 to 96% of the volatile substances which have a relative volatility value of more than 80 at infinite dilution is a useful guide in practice and will be found to be accomplished by a 5 to 15% removal of water from the coffee extract.

The quantity of volatile substances for this purpose can be conveniently assessed from total gas chromatographic counts measured above the headspace of a small quantity of the extract, by standard methods of injecting headspace gas into a suitable gas chromatographic equipment, recording and integrating the peak area of the trace.

The vapour strippings are then partially condensed under carefully controlled conditions. The condensation of the vapour strippings can be performed in a shell and tube condenser of adequate condensing capacity.

For the purpose of obtaining the green/nutty fraction flavourful composition — containing condensate, of this invention, a condensate temperature of from 32° F to 70° F has been found to be satisfactory and desirable, with the absolute pressure substantially the same as in the evaporative stripper zone. (between 16 inches Hg and atmospheric pressure).

Also, the condensing system and vacuum pump is preferably fitted with a means of determining the quantity or volume of non-condensable gases (measured at atmospheric pressure for convenience). This variable can be controlled by the introduction of non-condensable gases to the partial condensing system. The non-condensable gases have a material effect upon the composition of the condensate and afford another means for effecting the selective fractionation of the total stripped flavourful components leading to the recovery of a specific fraction of flavourful components. An amount of non-condensable gases within the range of from 0.1 to 2 $ft^3$ (STP) entering the condensing zone per one pound of condensate is desirable.

Thus, potential loss of any particular volatile components, especially the more volatile, that is, those having high values of relative volatility (considered at infinate dilution), as relevant to the small amounts of those substances present) is primarily controlled by the variables of temperature, pressure (vacuum) within the condenser and of the quantity of exiting non-condensable gases.

As previously mentioned, it has been noted that some loss of volatile components is desirable for the most desirable endflavour, and that maximum retention at the condensation stage is not necesarily the essential criterion of flavour quality as has been assumed by previous workers. In fact, it has been determined that a condensate retaining 40% to 90% of the stripped flavourful components afforded a final product having the most desirable flavour.

The selected fraction of condensed aromatics are added back to the coffee extract subsequent to the coffee extract being concentrated to a concentration of at least 37% w/w solubles, which may in fact be as high as 55%. The evaporation of the bulk stripped extract may be carried out in a suitable evaporator, preferably a two-stage film evaporator. Suitable pressures in the evaporator are 15 inches mercury or higher (absolute pressure) for the first stage and 4 inches Hg or below in the second stage. The condensate from this evaporator is discarded. The strippings should be immediately metered into the concentrate at the correct stochiometric level in respect of the quantity of soluble solids present and ensuring a homogeneous product for subequent low temperature spray drying. Since the addition of strippings to the concentrated extract necessarily lowers its solubles concentration by a few percent the concentration of the extract before spray drying should not be less than 35%.

The resulting fortified concentrated coffee extract is then spray dried to retain the flavour therein to the maximum degree. With extract concentrations of about 35–40%, using a conventional spray dryer with centrifugal spray nozzles; a technique described in U.K. Pat. Specification No. 1,289,439 may be usefully followed.

Desirable extract feed temperature is generally found to be 70° F or less and indeed a temperature of down to 27° F is advantageous. The correct choice of type, size of nozzles and operating pressure is important; for example, for an extract concentration of 36% a nozzle pressure ranging from 700 psig to 1400 psig, a low outlet temperature of 200°–210° F and a relatively low inlet temperature of 420°–440° F should be employed with an extract concentration of 38%, an inlet air temperature of up to 550° F may be used. These conditions, of course, depend somewhat on the actual concentration of the extract and the desired size of the droplets being dried. They may be readily seen to be differentiated from conventional spray drying conditions of lower centrifugal nozzle pressures and higher air temperature conditions, and may be characterized as low temperature spray drying with controlled atomization. A particular feature is that the powder particle average size obtained will be somwhat smaller, between 100 and 300 microns and preferably about 200 microns.

If the product is to be produced in the alternative agglomerated granular form, the powder need only be spray dried to about 4–6% moisture content, with provides an added advantage for flavour retention. However, if the finished product is to be the spray dried power, it is then necessary to dry the product to a moixture content of 4% or less.

With extract concentration between 40–55%, which may also be usefully attained, the required spray drying conditions for maximizing volatile flavour retention are similar, except that, to achieve satisfactory spray formation for the same order of particle size, it is necessary to have a feed extract at a higher temperature of up to 200° F but with similar operating nozzle pressures as previously described. It will be found that a somewhat higher retention of the volatile components will be obtained at these higher concentrations of extract, especially if even lower inlet temperatures are employed.

For example, an extract having a concentration of from 40 to 55%, may be spray dried using a centrifugal pressure nozzle at a pressure of from 900 to 2500 psig within a spray drying chamber at an inlet air temperature of 250° F to 550° F and an outlet air temperature of from 180° to 200° F, the extract having a temperature of between 140° F and 200° F at the inlet to the dryer.

Alternatively, and to a considerable degree considered more preferable because of appearance and bulk density, the spray dried product can be agglomerated to form granules, preferably in the equipment described in U.K. Pat. no. 1,224,807.

The spray dried powder is first milled to a fine particle size, also as desribed in this specification but the milled powder feed is agglomerated by steam-fusion under much milder conditions of air temperature than is generally described. The preferred temperature conditions are:

Inlet Air Temperature 280°–300° F
Outlet Air Temperature 160°–200° F

The important feature of the agglomeration process is to provide the required fusion temperature for the agglomerates (between 100°–250° F) with air at the lowest possible temperature. In this way, the volatile flavour constituents are retained to a higher level, than otherwise possible in this process. The moisture content of the agglomerated or granular product is however, allowed to be as high as 6–7%. This moisture content is then lowered to 4%, preferably not more than 3.5% and less as required for good shelf-life stability of the finished screen product, by a subsequent gentle after-drying process.

Products prepared by this process have been found to be significantly more flavourful than those in which the coffee extract is directly evaporated or spray dried and agglomerated by conventional procedures without adding back volatile flavour components and attention to maximizing flavour retention in the drying/agglomeration steps.

As can be construed from the above, the broad scope of the invention involves the addition of a selected fraction of coffee flavourful improvements to a concentrated coffee extract which has previously been stripped of its volatile flavourful components and then subjecting this fortified concentrated coffee extract to a dehydration process which maximizes the retention of the selected fraction of coffee aromatics in the finished product to provide a soluble coffee product which, has a distinct green/nutty flavour which has been demonstrated to enjoy wide consumer acceptance.

The salient feature of the invention is really two fold:
1. the technique of partial condensation of the flavour fractions through carefully controlled condenser conditions in order to obtain just that portion of the total coffee flavourful components original present in a commercial coffee extract which provide a finished product with a preponderance of nutty/green flavour and 2. the low temperature drying/agglomeration process for the concentrated extract fortified with the selected fraction of coffee flavourful components.

Those skilled in the art will readily recognize that multiple condenser systems can be employed to obtain similar partial condensation effects and it is quite possible by the variation of condenser process conditions to select different fractions of flavourful components which will provide coffee products having flavour notes different from those described as green/nutty.

Such multiple condenser systems can be arranged for having operating pressures in the condenser zone which differ from the operating pressure in the actual evaporative stripping zone. One of the condensers of a multiple condensing system can be employed with refrigeration cooling to provide flavourful components in frozen form.

The following examples are illustrative but are not to be construed as limiting as to the preparation of the coffee aroma of this invention. The percentages expressed are on a weight basis unless otherwise indicated.

EXAMPLE 1

A blend of roasted coffee was extracted in a conventional countercurrent percolation battery, to a final draw-off solubles concentration of 20.0 w/w and cooled to 60° F. The extract was clarified by passage through a Westphalia centrifugal clarifier and passed to an APV Plate Evaporator (Series III model type PE - with 7 plate units) at the rate of 1600 lbs./hour operating at 18 inches mercury absolute pressure. Conditions were adjusted to strip a volatile-water fraction of 7.5% of the orginal weight of water in the extract. The strippings were condensed in a vertical tube and shell condenser of surface area of 180 sq. ft. on the shell side with vapour feed at the top, condensate/vent gas at the base. The cooling water entered at at temperature of 50° F, and left at 60° F (equal to condensate temperature).

The stripped extract was directly fed to a two-stage APV plate evaporator, operating at 4 inches mercury absolute pressure in the second stage and 12 inches mercury in the first stage. The jacket steam pressures did not exceed atmospheric. The final concentration of the stripped evaporated extract was 40.3%. The concentrated extract is cooled to 60° F and was mixed in-line with the strippings, on passage to a feed tank for the spray-drying operation, where the concentration of extract was now 36.0% w/w.

Spray drying was carried out in a tall spray-drying tower of 24 ft. diameter, fitted with four centrifugal spray nozzles (Delavan-Watson, Uniswirl 125/109).

The extract was cooled to 40°-50° F on its way to the nozzles, and a spray nozzle pressure of 700 psig was used. The dryer air inlet temperature was 420° F and the outlet temperature was deliberately set low at 200° C. The total powder product from the dryer was collected. The powder product had a moisture content of 5%, and average particle size of about 200 microns.

The spray-dried powder was then milled to a fine particle size (less than 50 micron size) by a Bauermeister Mill at the rate of some 3800 lbs./hr. at ambient temperature. The fine powder was then fed to an agglomerator of the type described in U.K. Patent Specification no. 1,224,807 but operated such that the main inlet air temperature was 280° F and the outlet temperature 195° F.

The coarse agglomerates were cooled to 80° F and screened over a 350 micron screen and over an 890 micron screen. The fines were returned to the milling operation, whilst the required granular product (about 50% on 1680 micron screen) at about 6% moisture was immediately passed over a vibratory bed dryer. This dryer was operated with a up-through current of warm air at 200° F in a first section followed by a second section with dehumidified air at 20° C, with a time of passage of about 2 minutes. The resultant product had a moisture content of 4%, with a freeflow bulk density of 23 g/100 ml, a desirably dark colour with the following screen analysis 25% on 2380, 25% on 1680, 47% on 420 microns, and 3% through 420 microns. The granular product was found to be of desirable particle strength for subsequent handling operations and consumer use. Before packing into jars, the product was plated with 0.25% coffee aroma oil obtained by expression of roasted coffee in an air-free atmosphere. The final oxygen content of the packed product was less than 4%.

The product was found to have green/nutty flavour notes, when compared with the blend flavour of a similar granular product made conventionally from the same blend. In a conventional process, the same initial extract was evaporated to about 30% in one step, and all the condensate discarded; spray-drying was carried out in the same type of equipment at temperatures of 500° F and 240° F (outlet) with a low nozzle pressure about 300 psig and the agglomeration of the spray-dried product was carried out in the same type of equipment, but at higher temperatures to give directly a final moisture content of 4%. On consumer testing the enhanced product was found to have much greater acceptability than the conventional product.

In the course of this example, headspace volatile amounts or values for the various liquid extracts obtained during the process were assessed by a gas chromotagraphic method, and the efficiency of stripping/condensation of the flavourful components calculated.

To determine total GC values, of a sample of extract, the extract is first diluted to a standard concentration of 15% w/w solids. A 5 ml. sample is then placed in a small phial of 30 ml. capacity, filled with a septum cap. The phial is then placed in an agitated water-bath at 40° C (104° F) for 20 minutes to equilibriate the headspace with the extract. 2 ml sample of headspace gas is withdrawn by a syringe, and injected into the Gas Chromatographic equipment fitted with a Flame Ionization Detector, the output of which is fed to a numerical integrator. The GC values are obtained by reference against a standard of 2 - butanol/water (0.1% solution) directly injected.

Stripping efficiency is assessed from the percentage of the GC $$\text{Values of the } \frac{\text{Original Extract} - \text{stripped extract}}{\text{Original extract}}$$

and the condensing efficiency, from $$\frac{(\text{Evaporated extract} + \text{strippings added}) - \text{Evaporated extract}}{\text{Original extract} - \text{stripped extract}}$$

In this example, the following values were obtained and the corresponding efficiencies calculated:

| | |
|---|---|
| Feed extract to stripping zone | 44,100 units |
| Stripped extract from stripping zone | 3,400 units |
| Evaporated extract | 400 units |
| Evaporated extract with strippings added | 32,400 units |
| Stripping Efficiency | 92% |
| Condensing Efficiency | 79% |

EXAMPLE II 500 lbs. coffee extract at 16% w/w concentration were taken from commercial extraction battery, cooled to 70° F, and divided into two parts. The first part was stripped in a pilot plant Luwa Wiped Film Evaporator at the rate of 10 lbs./hours, at a pressure of 10 inches Hg Abs olute pressure, with a 6½ % strip of water, when the stripping efficiency was found to be 95% (as measured by the GC headspace method already described). The second portion were similarly stripped at 18 inches abs Hg pressure, when the measured efficiency was found to be 97%. This data illustrates the small difference in stripping efficiency at the two different pressures. The stripped vapours in each case were condensed at the corresponding stripping pressures, in a glass shell and tube condenser with a condensate exiting at 68° F.

It was noted that the non-condensable gas flow rate was very low, at less than 0.1 cfm (atmospheric pressure), or non-condensable gas/condensate weight ratio of 0.1 ((cfm)(lbs)). The condensing efficiency at the two pressure, of 10 inches Hg Abs and 18 inches Hg Absolute were found to be 89% and 92% respectively, thus illustrating a marginal difference in condensing efficiency, indicating the effect of the low non-condensable gas rate. In comparison, with higher non-condensable gas rate, in the neighbourhood of ½ cu.ft/in. in the same equipment, condenser efficiencies of around 70-80% have been observed, whilst still maintaining desired nutty/green flavour characteristics. This indicates a significant influence of the non-condensable volume (condensate weight ratio) on the condenser efficiency, which in turn influences the flavour quickly of the partial condensate.

What is claimed is:

1. In a process for the preparation of soluble coffee powder obtained by dehydrating an aqueous roasted and ground coffee extract, the improvements which comprise;
   a. evaporatively stripping the volatile flavourful components from the aqueous coffee extract in an evaporation zone at an absolute pressure ranging from 16 inches mercury to atmospheric pressure and vaporizing 5 to 15% of the water in the aqueous coffee extract, said water vapour containing the stripped flavourful coffee components;
   b. partially condensing the stripped volatile flavourful components-containing water vapour mixture in a condensing zone at an absolute pressure ranging from 16 inches mercury to atmospheric pressure, the condensate as it exits from the condensing zone is within a temperature range from 33° F to 70° F to recover an aqueous solution of condensed flavourful and aroma component;
   c. concentrating the stripped aqueous coffee extract from step (a) to form a concentrated coffee extract having a solids content ranging from 37% to 55% (w/w);
   d. admixing the aqueous solution of flavourful components of step (b) with the concentrated coffee extract of step (c);
   e. feeding the mixture of step (d) to a spray dryer within a temperature range from 27° F to 200° F;
   f. spray drying the mixture of step (e) at a droplet size of between 100 and 300 microns using a spray drying nozzle pressure of from 700 to 2500 psig, an inlet air temperature of between 250° F and 550° F and an outlet air temperature of between 180° F and 230° F.

2. A process as claimed in claim 1, wherein the mixture of step (d), having a soluble solids content of 35 to 37%, is cooled to 40° F to 50° F and is spray dried using a spray drying nozzle pressure of 700 psig to 1000 psig, an inlet air temperature of 420° F to 460° F and an outlet air temperature of 190° F to 210° F.

3. A process as claimed in claim 1, wherein 0.2 to 2 cubic feet under standard pressure and temperature conditions of non-condensable gases are introduced into the condenser zone per one pound of condensate exiting from the condenser zone.

4. A process as claimed in claim 1, wherein further to the spray drying of step (f) the spray dried coffee soluble solids are milled to an average particle size of less than 50 microns and agglomerated by steam fusing the milled particles at a temperature ranging from 100° F to 250° F to form granules of coffee soluble solids having a moisture content of 4% to 7%, screening the granules and gently after-drying the desired screened fraction to a final moisture content of 3.5%.

5. A process as claimed in claim 4, including the step of plating the resulting after dried granules with expressed coffee aroma oil.

6. A process as claimed in claim 1, wherein the stripped volatile flavourful component - containing water vapour mixture is condensed in a two-stage condensing zone the second stage condensing zone being maintained at atmospheric pressure.

* * * * *